United States Patent
Tsay et al.

(10) Patent No.: US 12,456,093 B2
(45) Date of Patent: Oct. 28, 2025

(54) CORPORATE HIERARCHY TAGGING

(71) Applicant: S&P Global Inc., New York, NY (US)

(72) Inventors: Brian Tsay, Sunnyvale, CA (US);
Jason Prentice, Lexington, MA (US);
James Ryan Psota, Cambridge, MA (US)

(73) Assignee: S&P Global Inc., New York, NY (US)

( * ) Notice: Subject to any disclaimer, the term of this patent is extended or adjusted under 35 U.S.C. 154(b) by 976 days.

(21) Appl. No.: 17/446,509

(22) Filed: Aug. 31, 2021

(65) Prior Publication Data
US 2023/0066971 A1 Mar. 2, 2023

(51) Int. Cl.
*G06Q 10/087* (2023.01)
*G06F 16/903* (2019.01)
*G06F 18/213* (2023.01)
*G06N 3/08* (2023.01)

(52) U.S. Cl.
CPC ..... *G06Q 10/087* (2013.01); *G06F 16/90335* (2019.01); *G06F 18/213* (2023.01); *G06N 3/08* (2013.01)

(58) Field of Classification Search
CPC ............ G06Q 10/087; G06F 16/90335; G06F 16/906; G06F 18/213; G06N 3/08; G06N 3/084; G06N 3/0464; G06N 20/20
See application file for complete search history.

(56) References Cited

U.S. PATENT DOCUMENTS

| | | |
|---|---|---|
| 8,674,993 B1 | 3/2014 | Fleming et al. |
| 8,892,989 B1 | 11/2014 | Lieb et al. |
| 11,144,994 B1 | 10/2021 | Hazelton et al. |
| 11,640,230 B2 | 5/2023 | Christie et al. |
| 2015/0052441 A1 | 2/2015 | Degioanni |
| 2016/0260063 A1 | 9/2016 | Harris et al. |
| 2020/0201584 A1 | 6/2020 | Xu et al. |

(Continued)

FOREIGN PATENT DOCUMENTS

CN 112883123 A * 6/2021 ........... G06F 16/288

OTHER PUBLICATIONS

Wei, Jason, and Kai Zou. "Eda: Easy data augmentation techniques for boosting performance on text classification tasks." arXiv preprint arXiv:1901.11196 (2019). (Year: 2019).*

(Continued)

*Primary Examiner* — Jennifer N Welch
*Assistant Examiner* — Megan Elizabeth Hwang
(74) *Attorney, Agent, or Firm* — Yee & Associates, P.C.

(57) ABSTRACT

A method for identifying a parent company in a corporate hierarchy is provided. A neural network embeds a number of company names into respective numeric vectors and then indexes the vectors into an approximate nearest neighbors (ANN) index according to euclidean distances between them. In response to a query regarding a parent company of a specified query company, a top N number of nearest neighbor companies to the query company is extracted from the ANN index. A machine learning voting model determines which, if any, of the extracted nearest neighbor companies has a parent company that best corresponds to the query company. If an extracted nearest neighbor company has a parent company that best corresponds to the query company, the parent company is displayed to a user through a user interface.

9 Claims, 6 Drawing Sheets

(56) References Cited

U.S. PATENT DOCUMENTS

| | | | |
|---|---|---|---|
| 2020/0279190 A1 | 9/2020 | Kitajima | |
| 2020/0380298 A1* | 12/2020 | Aggarwal | G06V 30/19147 |
| 2021/0081855 A1* | 3/2021 | Timme | G06F 16/9537 |
| 2021/0111962 A1 | 4/2021 | Todd | |
| 2021/0133015 A1 | 5/2021 | Agarwal et al. | |
| 2021/0342785 A1 | 11/2021 | Mann et al. | |
| 2022/0270591 A1* | 8/2022 | Shukla | G06F 18/22 |
| 2022/0391690 A1* | 12/2022 | Wang | G06Q 10/1053 |
| 2023/0038579 A1* | 2/2023 | Wang | G06F 18/2415 |
| 2023/0177357 A1* | 6/2023 | Vinod | G06N 5/048 |
| | | | 706/46 |

OTHER PUBLICATIONS

Li, Yuliang, et al. "Deep entity matching with pre-trained language models." arXiv preprint arXiv:2004.00584 (2020). (Year: 2020).*

Fakhraei, Shobeir, Joel Mathew, and Jose Luis Ambite. "Nseen: Neural semantic embedding for entity normalization." Joint European conference on machine learning and knowledge discovery in databases. Cham: Springer International Publishing, 2019. (Year: 2019).*

Cao, Rui. Corporate social network analysis: a deep learning approach. Diss. University of British Columbia, 2020. (Year: 2020).*

Shen, Jiaming, et al. "TaxoExpan: Self-supervised taxonomy expansion with position-enhanced graph neural network." Proceedings of the web conference 2020. 2020. (Year: 2020).*

Amorim, Leonardo Afonso, et al. "Accelerating word embedding generation with fine-grain parallelism." 2019 8th Brazilian Conference on Intelligent Systems (BRACIS). IEEE, 2019. (Year: 2019).*

* cited by examiner

CORPORATE HIERARCHY TAGGING

BACKGROUND INFORMATION

1. Field

The present disclosure relates generally to an improved computing system, and more specifically to a method of identifying a corporate parent of a company based on the name of the company.

2. Background

In supply chain management, large companies may operate through a number of subsidiaries. These subsidiaries typically have names that differ from that of the corporate parent, often as variants of the parent name. However, some subsidiary names may differ considerably from that of the corporate parent. As a result, during the shipment of goods, especially internationally, the ultimate owner of the goods in question might not be readily apparent from the shipping labels encountered at various points of transit.

Therefore, it would be desirable to have a method and apparatus that take into account at least some of the issues discussed above, as well as other possible issues.

SUMMARY

An illustrative embodiment provides a computer-implemented method for identifying a parent company in a corporate hierarchy. The method comprises converting, by a neural network, a number of company names into respective numeric vectors and then indexing the numeric vectors into an approximate nearest neighbors (ANN) index according to euclidean distances between the vectors. In response to a query regarding a specified query company within the number of company names, wherein the query is for a parent company of the query company, a top N number of nearest neighbor companies to the query company is extracted from the ANN index. A machine learning voting model determines which, if any, of the extracted nearest neighbor companies has a parent company that best corresponds to the query company. If an extracted nearest neighbor company has a parent company that best corresponds to the query company, the parent company is displayed to a user through a user interface.

Another illustrative embodiment provides a system for identifying a parent company in a corporate hierarchy. The system comprises a storage device configured to store program instructions and one or more processors operably connected to the storage device and configured to execute the program instructions to cause the system to: convert, by a neural network, a number of company names into respective numeric vectors; index the numeric vectors into an approximate nearest neighbors (ANN) index according to euclidean distances between the vectors; receive a query regarding a specified query company within the number of company names, wherein the query is for a parent company of the query company; in response to the query, extract from the ANN index a top N number of nearest neighbor companies to the query company; determine, by a machine learning voting model, which, if any, of the extracted nearest neighbor companies has a parent company that best corresponds to the query company; and if an extracted nearest neighbor company has a parent company that best corresponds to the query company, display the parent company to a user through a user interface.

Another illustrative embodiment provides a computer program product for identifying a parent company in a corporate hierarchy. The computer program product comprises a computer-readable storage medium having program instructions embodied thereon to perform the steps of: converting, by a neural network, a number of company names into respective numeric vectors; indexing the numeric vectors into an approximate nearest neighbors (ANN) index according to euclidean distances between the vectors; receiving a query regarding a specified query company within the number of company names, wherein the query is for a parent company of the query company; in response to the query, extracting from the ANN index a top N number of nearest neighbor companies to the query company; determining, by a machine learning voting model, which, if any, of the extracted nearest neighbor companies has a parent company that best corresponds to the query company; and if an extracted nearest neighbor company has a parent company that best corresponds to the query company, displaying the parent company to a user through a user interface.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. The illustrative embodiments recognize and take into account that corporate subsidiaries do not necessarily have names that are similar to those of their corporate parents.

The illustrative embodiments also recognize and take into account that differences in corporate parent and subsidiary names can pose a challenge for supply chain management at different points of transit, depending on the name under which goods are shipped.

The illustrative embodiments provide a method for identifying corporate parents based on the names of subsidiaries. The illustrative apply techniques previously used in image and facial recognition settings (e.g., CF FaceNet) to tag companies to corporate families.

Figure 1:
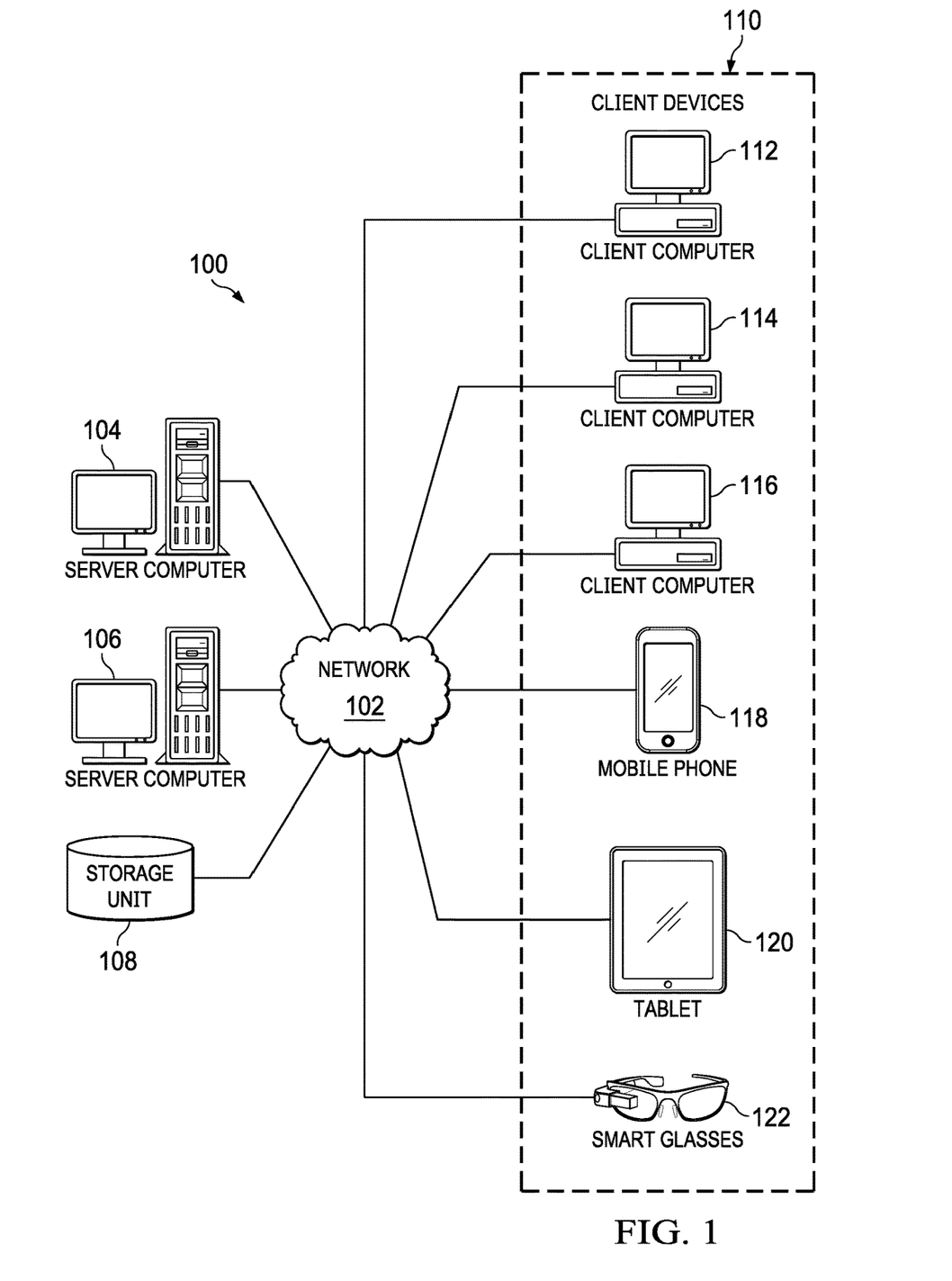
FIG. 1 is a pictorial representation of a network of data processing systems in which illustrative embodiments may be implemented.

With reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 might include connections, such as wire, wireless communication links, or fiber optic cables.

In the depicted example, server computer 104 and server computer 106 connect to network 102 along with storage unit 108. In addition, client devices 110 connect to network 102. In the depicted example, server computer 104 provides information, such as boot files, operating system images, and applications to client devices 110. Client devices 110 can be, for example, computers, workstations, or network computers. As depicted, client devices 110 include client computers 112, 114, and 116. Client devices 110 can also include other types of client devices such as mobile phone 118, tablet computer 120, and smart glasses 122.

In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, the program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

Figure 2:
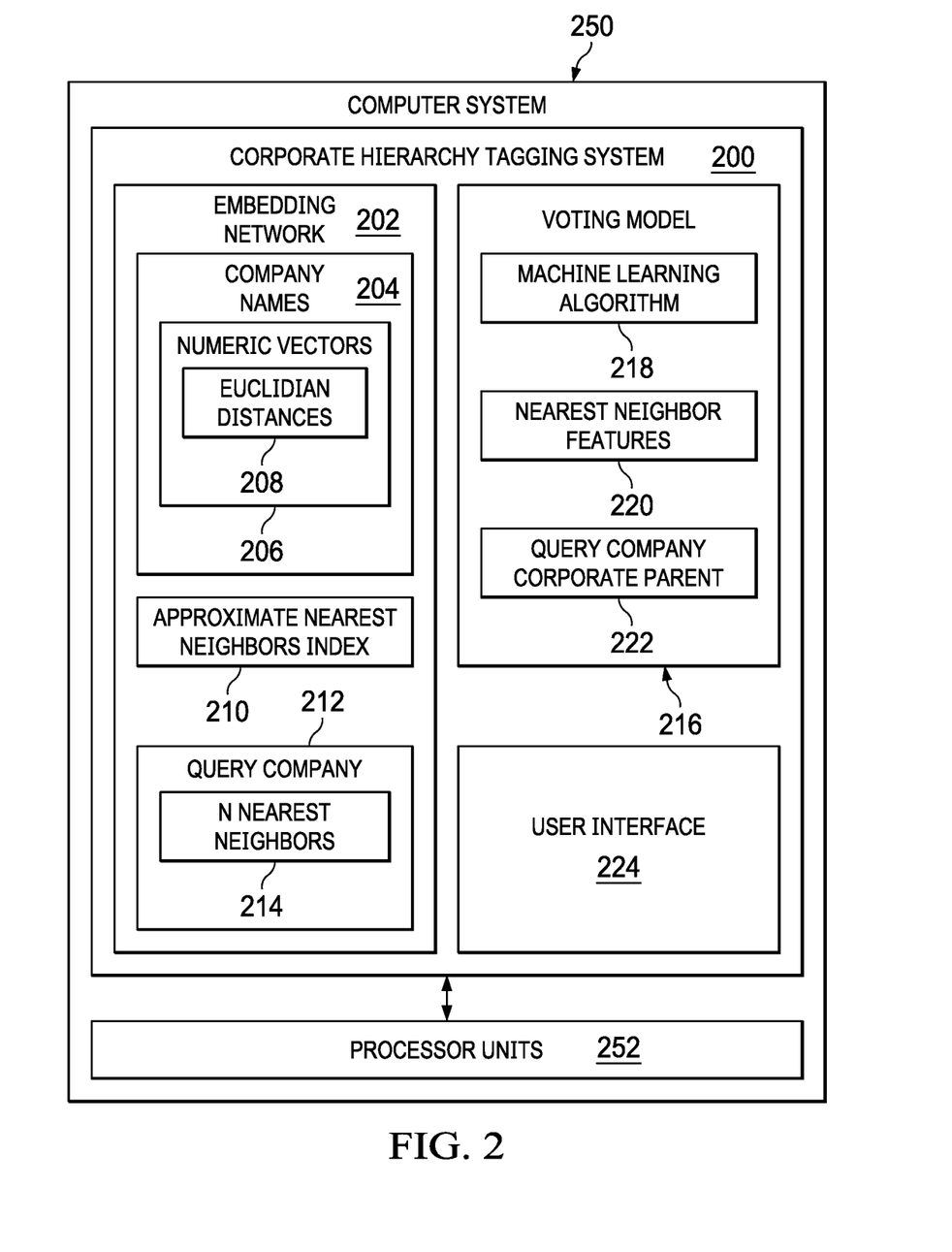
FIG. 2 is a block diagram of a corporate hierarchy tagging system depicted in accordance with an illustrative embodiment.

FIG. 2 is a block diagram of a corporate hierarchy tagging system depicted in accordance with an illustrative embodiment. Corporate hierarchy tagging system 200 might be implemented in network data processing system 100 in FIG. 1. Corporate hierarchy tagging system 200 comprises an embedding network 202 and machine learning voting model 216.

Embedding network 202 encodes a number of company names 204 into respective numeric vectors 206. Embedding network 202 takes a string as input and outputs a numeric vector that represent the string. Embedding network 202 may be built using, e.g., PyTorch. In an embodiment, embedding network 202 might comprise a character-based convolutional neural network. A character-based approach provides a way of to deal with minor misspellings, which might occur, for example, with shipping labels. The numeric vectors 206 have respective euclidean distances 208 from each other. Embedding network 202 indexes the numerical vectors 206 into an approximate nearest neighbor (ANN) index 210 according to their euclidean distances 208.

Embedding network 202 might be trained with training data of known corporate hierarchies with at least two companies. Company names can also go through a "data augmentation" process where the names are randomly transformed. The augmentation makes the model robust to the types of errors introduced to company names in shipping records. The transformations applied may include: adding common shipping terms to the beginning of a company string (e.g., "M/S" or "To the order of"), adding common shipping terms to the end of a company string (e.g., "as per attached rider"), changing the order of the word (e.g., "Toyota Motors" and "Motors Toyota"), randomly deleting characters (including spaces) in the company names, and adding random spaces to company names. Ultimately, embedding network 202 must learn which words in a name are company specific words and which word or not. For example, words such as "Motors," "Electronics," and "Systems" are not specific to any particular company and may in fact appear in the names of many unrelated companies.

The loss used to train embedding network 202 might be a triplet-based loss, wherein the network is pushed to learn embeddings in which distances between an "anchor" and a positive example (i.e., same class as the anchor) is shorter than the distance between the anchor and a negative example (i.e., different class from the anchor), plus some margin. Unlike contrastive loss, triplet-based loss does not push embeddings in the same class onto the same exact point but instead just keeps them in the same local neighborhood.

However, triplet networks require effort in determining the triplets (anchor, positive, and negative) that the network see ("hard mining"). Good triplet selection is important to ensure the network does not see only easy examples. Therefore, more difficult examples are shown to the network as training progresses.

At a local level, within a batch, the network is first shown easy examples so that it will first learn to be a strong similarity comparison tool. Then it can be shown "semi-hard" triplets wherein the positive example is closers to the anchor than the negative example, but the negative example lies within the margin, i.e., is relatively close. In later stages of training, triplets are formed with positive example that are farther away from the anchor and negative examples that are closer to the anchor. The margin can also be increased as training progresses.

The triplets can be determined by taking the pairwise distance between every company in a batch and using distances as weights for the likelihood of sampling a positive or negative example into a triplet. Under the easy regime, closer positive examples have a higher probability of joining the triplet while closer negative example have a lower probability of joining the triplet. This arrangement is reversed under a hard regime. When looking for semi-hard triplets, closer positive examples have a higher probability of being sampled, but negative examples that lie within the margin now have a higher probability of being sampled. Using weighted sampling instead of just picking the closest or furthest example empirically appears to improve training results.

The number of subsidiaries under a single ultimate corporate parent per batch might be limited to about half the batch size. If the members of a corporate hierarchy number more than half the batch size, a random sample of those subsidiaries is included to avoid having a single batch be dominated by a single corporate hierarchy and to ensure there will be negative examples in the batch.

At the global level, the pairwise distance between all the ultimate corporate parents is sought. The goal is to try to get corporate hierarchies with similar names into the same batch, otherwise the result is a group of dissimilar company names, and the model will not learn much of use. Ultimate corporate parents may be used as a proxy/"representative company" for their respective corporate hierarchies.

In response to a query regarding a corporate parent for a query company 212 among the company names 204, the corporate hierarchy tagging system 200 pulls the N (e.g., 10) nearest neighbors 214 to query company 212 from the ANN index 210. The method used to generate pairwise distances within batches cannot be used at the global level because there are too many companies (i.e., the GPU runs out of memory). Instead, at every iteration, the model generates embedding from the ultimate corporate parent names and puts them into the ANN index 210 and then queries the index for the closest nearest neighbors 214. This process is not necessarily deterministic since the nearest neighbors are only approximate.

After the N nearest neighbors 214 are extracted from the ANN index 210, the results are passed through a voting model 216 to determine to which corporate parent 222, if any, the query company 212 belongs. Voting model 216 applies machine learning algorithm 218 to the nearest neighbors 214 to determine whether the corporate parent: is the same as the corporate parent of the closest neighbor (i.e., "only close"), is the same as the modal corporate parent in the set of neighbors (i.e., "only modal"), is the same parent as both the modal and closest neighbor (i.e., "both", when the closest neighbor also belongs to the same corporate hierarchy as the modal hierarchy of the neighbors, and the query company belongs to that modal close parent), or does not belong to any of the same corporate hierarchies of its closest neighbors (i.e., "no parent").

Voting model 216 converts the N (e.g., 10) nearest neighbors 214 and their euclidean distances 208 into a set of nearest neighbor features 220. Nearest neighbor features 220 may include: the raw distances, a binary feature that indicates whether the closest neighbor belongs to the modal corporate hierarchy, the proportion of the nearest neighbors 214 that belong to the modal corporate hierarchy, the average distance between the neighbors belonging to the modal hierarchy and the query company 212, and the distance between the query company 212 and the closest neighbor which belongs to the modal corporate hierarchy.

When there is no mode, i.e., when all the nearest neighbors 214 belong to different corporate hierarchies, the calculations that use the mode may assume the parent of the furthest away neighbor is the modal parent. This assumption nudges the network model away from predicting that the corporate parent is the mode in such situations and to also make calculating the features more straightforward.

Training data for the voting model 216 may be drawn from manual concordance override data. Manual concordance override data consists of manual matches made between two companies, as determined by a human labeler. Labels may be generated in accordance with the categories above (i.e., "only close", "only modal", "both"). The corporate parents of manually matched companies can be used as the ground truth. If none of the closest neighbors has a corporate parent that matches the manually matched corporate parent, the label for the observation would end up as "no parent". In this portion of the hierarchy tagging, the embedding network 202 and the ANN index 210 are taken as fixed. Therefore, even if a corporate parent does exist, voting model 216 on its own cannot find it. Stated differently, rather than abstaining based on a score, voting model 216 predicts abstention as a category.

From these nearest neighbor features 220 voting model 216 identifies a corporate parent 222 for query company 212, if it determines such a parent company in fact exists. The query company corporate parent 222 may be displayed to a user on user interface 224 once it is identified by voting model 216.

Corporate hierarchy tagging system 200 can be implemented in software, hardware, firmware, or a combination thereof. When software is used, the operations performed by corporate hierarchy tagging system 200 can be implemented in program code configured to run on hardware, such as a processor unit. When firmware is used, the operations performed by corporate hierarchy tagging system 200 can be implemented in program code and data and stored in persistent memory to run on a processor unit. When hardware is employed, the hardware may include circuits that operate to perform the operations in corporate hierarchy tagging system 200.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

These components for corporate hierarchy tagging system 200 can be located in computer system 250, which is a physical hardware system and includes one or more data processing systems. When more than one data processing system is present in computer system 250, those data processing systems are in communication with each other using a communications medium. The communications medium can be a network. The data processing systems can be selected from at least one of a computer, a server computer, a tablet computer, or some other suitable data processing system.

For example, corporate hierarchy tagging system 200 can run on one or more processors 252 in computer system 250. As used herein a processor unit is a hardware device and is comprised of hardware circuits such as those on an integrated circuit that respond and process instructions and program code that operate a computer. When one or more processors 252 execute instructions for a process, one or more processors 252 that can be on the same computer or on different computers in computer system 250. In other words, the process can be distributed between processors 252 on the same or different computers in computer system 250. Further, one or more processors 252 can be of the same type or different type of processors 252. For example, one or more processors 252 can be selected from at least one of a single core processor, a dual-core processor, a multi-processor core, a general-purpose central processing unit (CPU), a graphics processing unit (GPU), a digital signal processor (DSP), or some other type of processor.

There are three main categories of machine learning: supervised, unsupervised, and reinforcement learning. Supervised machine learning comprises providing the machine with training data and the correct output value of the data. During supervised learning the values for the output are provided along with the training data (labeled dataset) for the model building process. The algorithm, through trial and error, deciphers the patterns that exist between the input training data and the known output values to create a model that can reproduce the same underlying rules with new data. Examples of supervised learning algorithms include regression analysis, decision trees, k-nearest neighbors, neural networks, and support vector machines.

If unsupervised learning is used, not all of the variables and data patterns are labeled, forcing the machine to discover hidden patterns and create labels on its own through the use of unsupervised learning algorithms. Unsupervised learning has the advantage of discovering patterns in the data with no need for labeled datasets. Examples of algorithms used in unsupervised machine learning include k-means clustering, association analysis, and descending clustering.

The illustrative embodiments may use supervised machine learning methods such as, e.g., regression, correlations, and clustering.

Figure 3:
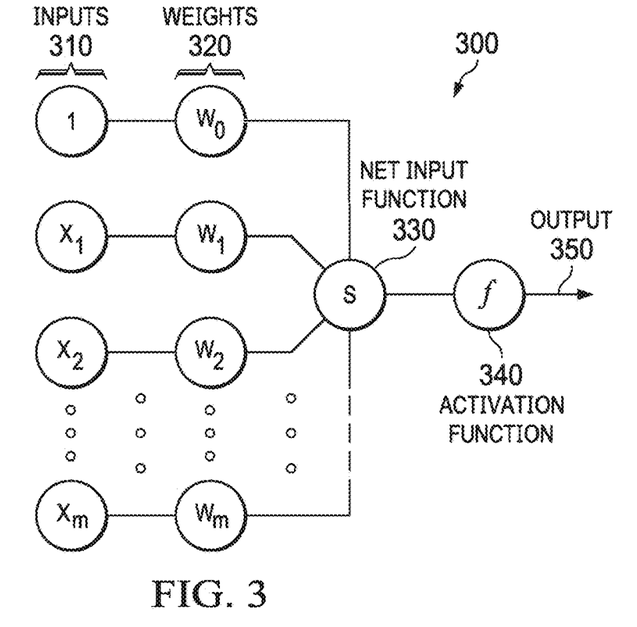
FIG. 3 is a diagram that illustrates a node in a neural network in which illustrative embodiments can be implemented.

FIG. 3 depicts a diagram illustrating a node in a neural network in which illustrative embodiments can be implemented. Node 300 combines multiple inputs 310 from other nodes. Each input 310 is multiplied by a respective weight 320 that either amplifies or dampens that input, thereby assigning significance to each input for the task the algorithm is trying to learn. The weighted inputs are collected by a net input function 330 and then passed through an activation function 340 to determine the output 350. The connections between nodes are called edges. The respective weights of nodes and edges might change as learning proceeds, increasing or decreasing the weight of the respective signals at an edge. A node might only send a signal if the aggregate input signal exceeds a predefined threshold. Pairing adjustable weights with input features is how significance is assigned to those features with regard to how the network classifies and clusters input data.

Neural networks are often aggregated into layers, with different layers performing different kinds of transformations on their respective inputs. A node layer is a row of nodes that turn on or off as input is fed through the network. Signals travel from the first (input) layer to the last (output) layer, passing through any layers in between. Each layer's output acts as the next layer's input.

Figure 4:
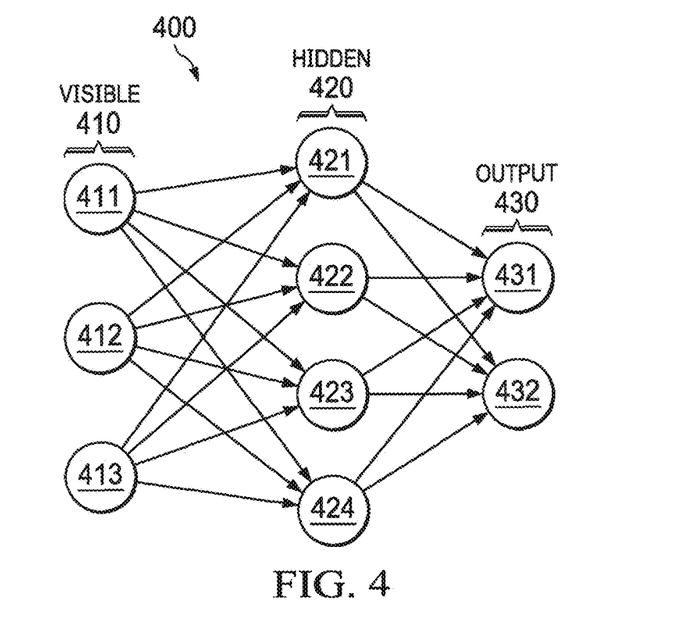
FIG. 4 is a diagram illustrating a neural network in which illustrative embodiments can be implemented.

FIG. 4 depicts a diagram illustrating a neural network in which illustrative embodiments can be implemented. As shown in FIG. 4, the nodes in the neural network 400 are divided into a layer of visible nodes 410, a layer of hidden nodes 420, and a layer of output nodes 430. The nodes in these layers might comprise nodes such as node 300 in FIG. 3. The visible nodes 410 are those that receive information from the environment (i.e., a set of external training data). Each visible node in layer 410 takes a low-level feature from an item in the dataset and passes it to the hidden nodes in the next layer 420. When a node in the hidden layer 420 receives an input value x from a visible node in layer 410 it multiplies x by the weight assigned to that connection (edge) and adds it to a bias b. The result of these two operations is then fed into an activation function which produces the node's output.

In fully connected feed-forward networks, each node in one layer is connected to every node in the next layer. For example, node 421 receives input from all of the visible nodes 411, 412, and 413 each x value from the separate nodes is multiplied by its respective weight, and all of the products are summed. The summed products are then added to the hidden layer bias, and the result is passed through the activation function to produce output to output nodes 431 and 432 in output layer 430. A similar process is repeated at hidden nodes 422, 423, and 424. In the case of a deeper neural network, the outputs of hidden layer 420 serve as inputs to the next hidden layer.

A typical process for training an artificial neural network may include providing an input having a known desired output. The input is propagated through the neural network until an output is produced at the output layer of the network. The output is then compared to the desired output, using a loss function. The resulting error value is calculated for each of the artificial neurons (nodes) in the output layer of the neural network. The error values are then propagated from the output back through the artificial neural network, until each artificial neuron in the network has an associated error value that reflects its contribution to the original output. Backpropagation uses these error values to calculate the gradient of the loss function. This gradient is used by an optimization method to update the weights in the artificial neural network in an attempt to minimize the loss function. This process of propagation and weight update is then repeated for other inputs having known desired outputs.

In machine learning, the aforementioned error is calculated via a cost function that estimates how the model is performing. It is a measure of how wrong the model is in terms of its ability to estimate the relationship between input x and output y, which is expressed as a difference or distance between the predicted value and the actual value. The cost function (i.e., loss or error) can be estimated by iteratively running the model to compare estimated predictions against known values of y during supervised learning. The objective of a machine learning model, therefore, is to find parameters, weights, or a structure that minimizes the cost function.

Neural network layers can be stacked to create deep networks. After training one neural net, the activities of its hidden nodes can be used as inputs for a higher level, thereby allowing stacking of neural network layers. Such stacking makes it possible to efficiently train several layers of hidden nodes. Examples of stacked networks include deep belief networks (DBN), deep Boltzmann machines (DBM), recurrent neural networks (RNN), and convolutional neural networks (CNN).

Figure 5:
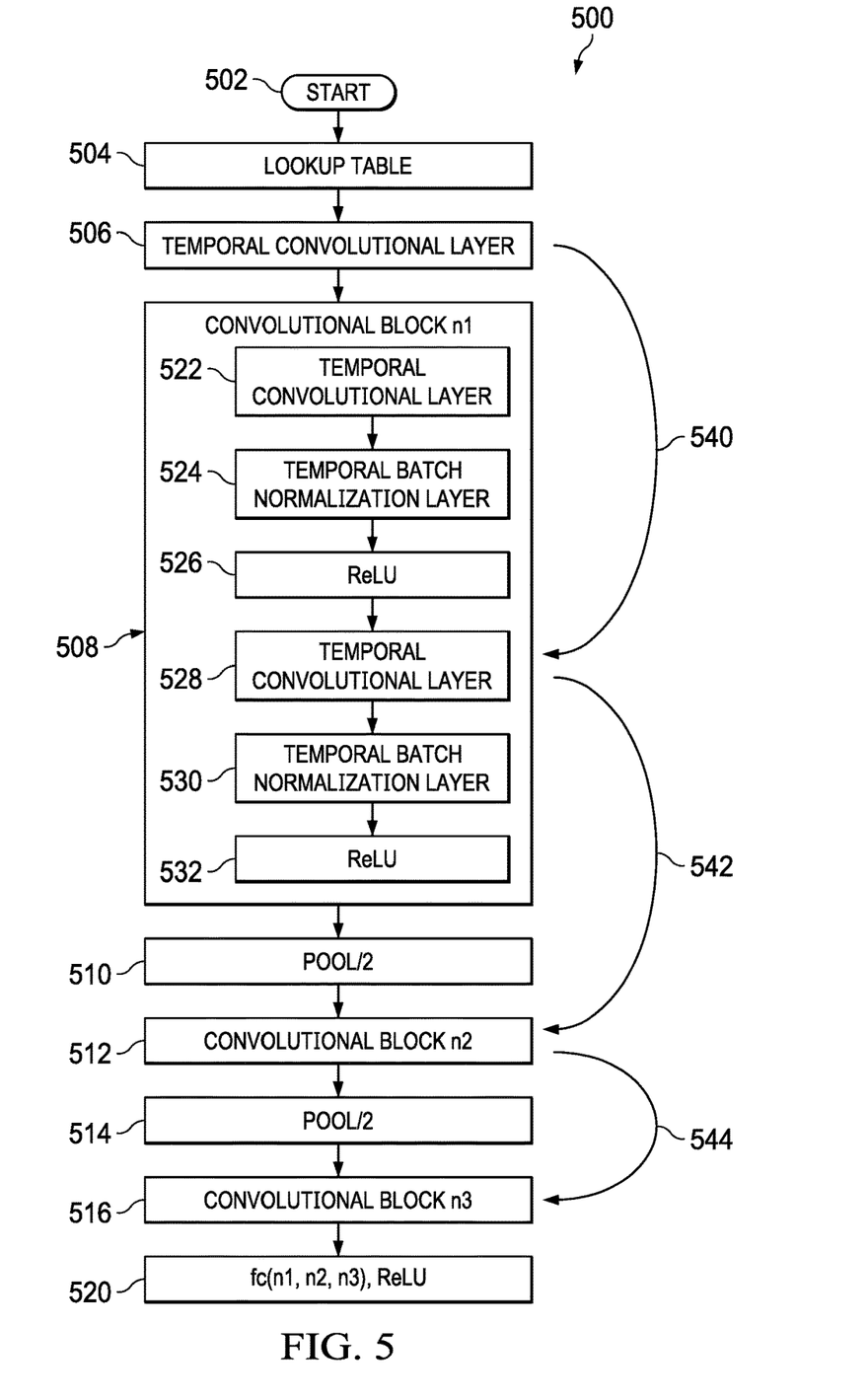
FIG. 5 depicts a diagram illustrating a very deep convolutional neural network with which the illustrative embodiments can be implemented.

FIG. 5 depicts a diagram illustrating a very deep convolutional neural network (VDCNN) with which the illustrative embodiments can be implemented. VDCNN 500 might be an example of embedding network 202 shown in FIG. 2. VDCNN 500 comprises a number of sequential layers.

When text 502 is received by VDCNN 500, lookup table 504 maps each character (e.g., "a") to a character vector embedding. For example, the character embedding may have a dimensionality of 16.

Temporal convolutional layer 506 applies convolutions of a specified kernel size. For example, temporal convolutional layer 506 may apply 64 convolutions of kernel size three.

Temporal convolutional layer 506 is then followed by a stack of temporal convolutional blocks 508, 512, 516. Each temporal convolutional block comprises two temporal convolutional layers 522, 528, each followed by a temporal batch normalization layer 524, 530 and a rectified linear unit (ReLU) 526, 532. The temporal convolutional layers 522, 528 apply a number of convolutions (filtering) of a specified kernel size (e.g., 3). The temporal batch normalization layers 524, 530 scale inputs to mean 0 and standard deviation 1 over temporal/sequential locations. ReLUs 526, 532 comprise nonlinear activation functions such as, e.g., activation function 340 in FIG. 3.

For ease of illustration, only the constituent elements of convolutional block 508 are illustrated, but it should be understood that convolutional blocks 512 and 516 have the same structure.

VDCNN 500 includes pooling operations 510, 514 between the convolutional blocks 508, 512, 516. Pooling operations 510, 514 halve the resolution each time. When the temporal resolution is halved, the number of feature maps is doubled, e.g., n1=128, n2=256, n3=512.

The resulting features from the convolutional block 508, 512, 516 are transformed into a single vector which serves as the input to fully connection network 520 with ReLU hidden units. Fully connected network 520 comprises a multi-layer network such as, e.g., neural network 400 in FIG. 4. Each layer of network 520 takes an input of one size and produces an out of another size, e.g., input of size n1 and output of size n2. The output is then fed into a ReLU activation function.

VDCNN 500 may also include optional connections (skip connections) 540, 542, 544 to help reduce degradation.

Figure 6:
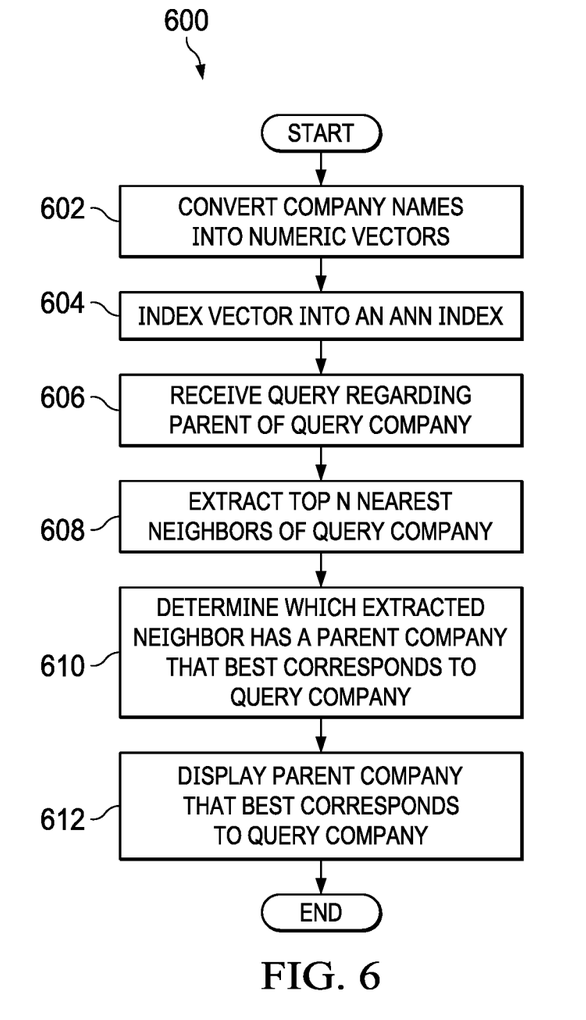
FIG. 6 depicts a flowchart illustrating a process for identifying a parent company in a corporate hierarchy in accordance with an illustrative embodiment.

FIG. 6 depicts a flowchart illustrating a process for identifying a parent company in a corporate hierarchy in accordance with an illustrative embodiment. Process 600 can be implemented in hardware, software, or both. When implemented in software, the process can take the form of program code that is run by one or more processor units located in one or more hardware devices in one or more computer systems. Process 600 might be implemented in corporate hierarchy tagging system 200 in FIG. 2.

Process 600 begins by converting, by a neural network, a number of company names into respective numeric vectors (step 602). The neural network might be a convolutional network such as VDCNN 500 shown in FIG. 5. The neural network may be trained with a triplet-based loss wherein the distance between an anchor and a positive example is made by the training process to be shorter than the distance between the anchor and a negative example.

The neural network may also be trained by randomly transforming company names. Transforming company names may comprise adding common shipping terms to the beginning of a company name, adding common shipping terms to the end of a company name, changing the order of words in a company name, deleting random letters from a company name, or adding random spaces in a company name.

Process 600 then indexes the numeric vectors into an approximate nearest neighbors (ANN) index according to euclidean distances between the vectors (step 604).

The system receives a query regarding a specified query company within the number of company names, wherein the query is for a parent company of the query company (step 606).

In response to the query, the system extracts from the ANN index a top N number of nearest neighbor companies to the query company (step 608).

A machine learning voting model determines which, if any, of the extracted nearest neighbor companies has a parent company that best corresponds to the query company (step 610).

The voting model converts the extracted nearest neighbor companies into a set of features comprising at least one of raw distance, a binary indication whether the closest of the extracted neighbors belongs to a modal corporate hierarchy, a proportion of the extracted nearest neighbors that belong to the modal corporate hierarchy, an average distance between the extracted nearest neighbors that belong to the modal corporate hierarchy, or the distance between the query company and the closest of the extracted neighbors that belongs to the modal corporate hierarchy.

The voting model may output that the parent company of the query company is the parent company of the nearest neighbor company, that the parent company of the query company is a modal parent company in a returned set of neighbor companies, or that no corporate hierarchy can be found to which the query company belongs among the nearest neighbor companies. If there is no mode among the neighbor companies, the voting model may assume a parent company of the farthest away neighbor company is the modal parent.

The voting model treats parent prediction as a multi-class classification problem. The model may be a random forest training the input features described above to predict one of the four classes described above. Whatever class is output by the voting model gets converted back into a parent company ID. For example, if the query company is the parent company of the nearest neighbor company, the voting model will go back to the nearest neighbor company and get the parent of its closest neighbor, returning that parent. The links between the closest neighbor company and the parent of the closest neighbor company are stored in the database.

If an extracted nearest neighbor company has a parent company that best corresponds to the query company, the system displays the parent company to a user through a user interface (step 612).

Process 600 then ends.

Figure 7:
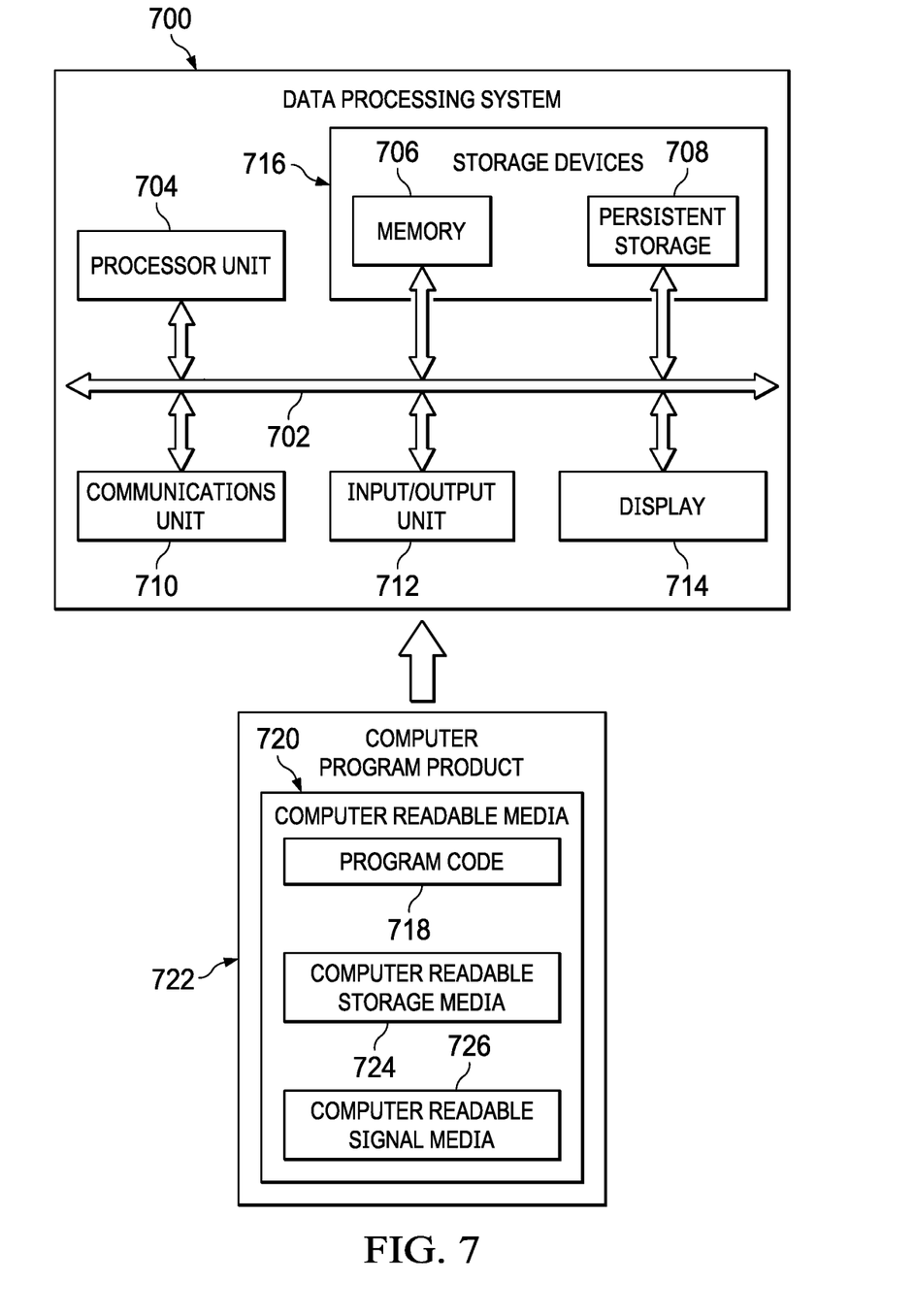
FIG. 7 is a block diagram of a data processing system in accordance with an illustrative embodiment.

Turning now to FIG. 7, an illustration of a block diagram of a data processing system is depicted in accordance with an illustrative embodiment. Data processing system 700 may be used to implement server computers 104 and 106 and client devices 110 in FIG. 1, as well as computer system 250 in FIG. 2. In this illustrative example, data processing system 700 includes communications framework 702, which provides communications between processor unit 704, memory 706, persistent storage 708, communications unit 710, input/output unit 712, and display 714. In this example, communications framework 702 may take the form of a bus system.

Processor unit 704 serves to execute instructions for software that may be loaded into memory 706. Processor unit 704 may be a number of processors, a multi-processor core, or some other type of processor, depending on the particular implementation. In an embodiment, processor unit 704 comprises one or more conventional general-purpose central processing units (CPUs). In an alternate embodiment, processor unit 704 comprises one or more graphical processing units (CPUs).

Memory 706 and persistent storage 708 are examples of storage devices 716. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 716 may also be referred to as computer-readable storage devices in these illustrative examples. Memory 706, in these examples, may be, for example, a random access memory or any other suitable volatile or non-volatile storage device. Persistent storage 708 may take various forms, depending on the particular implementation.

For example, persistent storage 708 may contain one or more components or devices. For example, persistent storage 708 may be a hard drive, a flash memory, a rewritable optical disk, a rewritable magnetic tape, or some combination of the above. The media used by persistent storage 708 also may be removable. For example, a removable hard drive may be used for persistent storage 708. Communications unit 710, in these illustrative examples, provides for communications with other data processing systems or devices. In these illustrative examples, communications unit 710 is a network interface card.

Input/output unit 712 allows for input and output of data with other devices that may be connected to data processing system 700. For example, input/output unit 712 may provide a connection for user input through at least one of a keyboard, a mouse, or some other suitable input device. Further, input/output unit 712 may send output to a printer. Display 714 provides a mechanism to display information to a user.

Instructions for at least one of the operating system, applications, or programs may be located in storage devices 716, which are in communication with processor unit 704 through communications framework 702. The processes of the different embodiments may be performed by processor unit 704 using computer-implemented instructions, which may be located in a memory, such as memory 706.

These instructions are referred to as program code, computer-usable program code, or computer-readable program code that may be read and executed by a processor in processor unit 704. The program code in the different embodiments may be embodied on different physical or computer-readable storage media, such as memory 706 or persistent storage 708.

Program code 718 is located in a functional form on computer-readable media 720 that is selectively removable and may be loaded onto or transferred to data processing system 700 for execution by processor unit 704. Program code 718 and computer-readable media 720 form computer program product 722 in these illustrative examples. In one example, computer-readable media 720 may be computer-readable storage media 724 or computer-readable signal media 726.

In these illustrative examples, computer-readable storage media 724 is a physical or tangible storage device used to store program code 718 rather than a medium that propagates or transmits program code 718. Computer readable storage media 724, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 718 may be transferred to data processing system 700 using computer-readable signal media 726. Computer-readable signal media 726 may be, for example, a propagated data signal containing program code 718. For example, computer-readable signal media 726 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 700 are not meant to provide architectural limitations to the manner in which different embodiments may be implemented. The different illustrative embodiments may be implemented in a data processing system including components in addition to or in place of those illustrated for data processing system 700. Other components shown in FIG. 7 can be varied from the illustrative examples shown. The different embodiments may be implemented using any hardware device or system capable of running program code 718.

As used herein, "a number of," when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method for identifying a parent company in a corporate hierarchy, the method comprising:
   using a number of processors to perform the steps of:
   training a neural network iteratively with training data of known corporate hierarchies using a triplet-based loss function that creates vector embeddings wherein distances between companies in a same corporate hierarchy are shorter than distances between unrelated companies and wherein the training data includes randomly transformed company names comprising at least one of:
   adding common shipping terms to a beginning of a company name;
   adding common shipping terms to an end of the company name;
   changing an order of words in the company name;
   deleting random letters from the company name; or
   adding random spaces in the company name;
   building and maintaining an approximate nearest neighbors (ANN) index by indexing the vector embeddings according to euclidean distances between the vector embeddings, wherein the ANN index enables similarity searches across corporate databases;
   converting, by the trained neural network, a number of company names into respective vector embeddings wherein the neural network utilizes a character-based convolutional architecture that accounts for minor misspellings in shipping records;
   receiving a query regarding a specified query company within the number of company names, wherein the query is for identifying a parent company of the specified query company;
   in response to the query, extracting from the ANN index a top N number of nearest neighbor companies to the specified query company;
   determining, by a machine learning voting model, which, if any, of the extracted nearest neighbor companies has the parent company that best corresponds to the specified query company, wherein the machine learning voting model evaluates multiple features derived from the extracted nearest neighbor companies to identify the corporate hierarchy that best corresponds to the specified query company, including determining a most frequently occurring (modal) parent company of the extracted nearest neighbor companies, wherein, if there is no mode among the extracted nearest neighbor companies, the machine learning voting model designates a parent company of a nearest neighbor company having a greatest euclidean distance from the specified query company as a default modal parent company for feature calculation purposes; and
   responsive to a determination that an extracted nearest neighbor company has the parent company that best corresponds to the specified query company, displaying the parent company to a user through a user interface.

2. The method of claim 1, wherein the machine learning voting model converts the extracted nearest neighbor companies into a set of features comprising at least one of:
   raw distance;
   binary indication whether a closest of the extracted nearest neighbor companies belongs to a most frequently occurring (modal) corporate hierarchy;
   a proportion of the extracted nearest neighbor companies that belong to the modal corporate hierarchy;
   average distance between the extracted nearest neighbor companies that belong to the modal corporate hierarchy; or
   a euclidean distance between the specified query company and the closest of the extracted neighbor companies that belongs to the modal corporate hierarchy.

3. The method of claim 1, wherein the machine learning voting model outputs a selection from following predictions:
   the parent company of the specified query company is the parent company of the extracted nearest neighbor company;
   the parent company of the specified query company is a most frequently occurring (modal) parent company in a returned set of neighbor companies; or
   no corporate hierarchy can be found to which the specified query company belongs among the extracted nearest neighbor companies.

4. A system for identifying a parent company in a corporate hierarchy, the system comprising:
   a storage device configured to store program instructions; and
   one or more processors operably connected to the storage device and configured to execute the program instructions to cause the system to:
   train a neural network iteratively with training data of known corporate hierarchies using a triplet-based loss function that creates vector embeddings wherein distances between companies in a same corporate hierarchy are shorter than distances between unrelated companies and wherein the training data includes randomly transformed company names comprising at least one of:
add common shipping terms to a beginning of a company name;
add common shipping terms to an end of the company name;
change an order of words in the company name;
delete random letters from the company name; or
add random spaces in the company name;
build and maintain an approximate nearest neighbors (ANN) index by indexing the vector embeddings according to euclidean distances between the vector embeddings, wherein the ANN index enables similarity searches across corporate databases;
convert, by the trained neural network, a number of company names into respective vector embeddings wherein the neural network utilizes a character-based convolutional architecture that accounts for minor misspellings in shipping records;
receive a query regarding a specified query company within the number of company names, wherein the query is for identifying a parent company of the specified query company;
in response to the query, extract from the ANN index a top N number of nearest neighbor companies to the specified query company;
determine, by a machine learning voting model, which, if any, of the extracted nearest neighbor companies has the parent company that best corresponds to the specified query company, wherein the machine learning voting model evaluates multiple features derived from the extracted nearest neighbor companies to identify the corporate hierarchy that best corresponds to the specified query company, including determining a most frequently occurring (modal) parent company of the extracted nearest neighbor companies, wherein, if there is no mode among the extracted nearest neighbor companies, the machine learning voting model designates a parent company of a nearest neighbor company having a greatest euclidean distance from the specified query company as a default modal parent company for feature calculation purposes; and
responsive to a determination that an extracted nearest neighbor company has the parent company that best corresponds to the specified query company, display the parent company to a user through a user interface.

5. The system of claim 4, wherein the machine learning voting model converts the extracted nearest neighbor companies into a set of features comprising at least one of:
raw distance;
binary indication whether a closest of the extracted neighbor companies belongs to a most frequently occurring (modal) corporate hierarchy;
a proportion of the extracted nearest neighbor companies that belong to the modal corporate hierarchy;
average distance between the extracted nearest neighbor companies that belong to the modal corporate hierarchy; or
a euclidean distance between the specified query company and the closest of the extracted neighbor companies that belongs to the modal corporate hierarchy.

6. The system of claim 4, wherein the machine learning voting model outputs a selection from following predictions:
the parent company of the specified query company is the parent company of the extracted nearest neighbor company;

the parent company of the specified query company is a most frequently occurring (modal) parent company in a returned set of neighbor companies; or
no corporate hierarchy can be found to which the specified query company belongs among the extracted nearest neighbor companies.

7. A computer program product for identifying a parent company in a corporate hierarchy, the computer program product comprising:
a computer-readable storage medium having program instructions embodied thereon to perform the steps of:
training a neural network iteratively with training data of known corporate hierarchies using a triplet-based loss function that creates vector embeddings wherein distances between companies in a same corporate hierarchy are shorter than distances between unrelated companies and wherein the training data includes randomly transformed company names comprising at least one of:
adding common shipping terms to a beginning of a company name;
adding common shipping terms to an end of the company name;
changing an order of words in the company name;
deleting random letters from the company name; or
adding random spaces in the company name;
building and maintaining an approximate nearest neighbors (ANN) index by indexing the vector embeddings according to euclidean distances between the vector embeddings, wherein the ANN index enables similarity searches across corporate databases;
converting, by the trained neural network, a number of company names into respective numeric vector embeddings, wherein the neural network utilizes a character-based convolutional architecture that accounts for minor misspellings in shipping records;
receiving a query regarding a specified query company within the number of company names, wherein the query is for identifying a parent company of the specified query company;
in response to the query, extracting from the ANN index a top N number of nearest neighbor companies to the specified query company;
determining, by a machine learning voting model, which, if any, of the extracted nearest neighbor companies has the parent company that best corresponds to the specified query company, wherein the machine learning voting model evaluates multiple features derived from the extracted nearest neighbor companies to identify the corporate hierarchy that best corresponds to the specified query company, including determining a most frequently occurring (modal) parent company of the extracted nearest neighbor companies, wherein, if there is no mode among the extracted nearest neighbor companies, the machine learning voting model designates a parent company of a nearest neighbor company having a greatest euclidean distance from the specified query company as a default modal parent company for feature calculation purposes; and
responsive to a determination that an extracted nearest neighbor company has the parent company that best corresponds to the specified query company, displaying the parent company to a user through a user interface.

8. The computer program product of claim 7, wherein the machine learning voting model converts the extracted nearest neighbor companies into a set of features comprising at least one of:

raw distance;

binary indication whether a closest of the extracted nearest neighbor companies belongs to a most frequently occurring (modal) corporate hierarchy;

a proportion of the extracted nearest neighbor companies that belong to the modal corporate hierarchy;

average distance between the extracted nearest neighbor companies that belong to the modal corporate hierarchy; or a euclidean distance between the specified query company and the closest of the extracted nearest neighbor companies that belongs to the modal corporate hierarchy.

9. The computer program product of claim 7, wherein the machine learning voting model outputs a selection from following predictions:

the parent company of the specified query company is the parent company of the extracted nearest neighbor company;

the parent company of the specified query company is a most frequently occurring (modal) parent company in a returned set of neighbor companies; or no corporate hierarchy can be found to which the specified query company belongs among the extracted nearest neighbor companies.

* * * * *